(12) United States Patent
Suzuki

(10) Patent No.: US 8,702,155 B2
(45) Date of Patent: Apr. 22, 2014

(54) COWL LOUVER SEALING STRUCTURE

(75) Inventor: Kosuke Suzuki, Toyota (JP)

(73) Assignee: Kojima Press Industry Co., Ltd., Toyota-shi, Aichi-ken (JP)

( * ) Notice: Subject to any disclaimer, the term of this patent is extended or adjusted under 35 U.S.C. 154(b) by 79 days.

(21) Appl. No.: 13/234,808

(22) Filed: Sep. 16, 2011

(65) Prior Publication Data

US 2012/0091756 A1    Apr. 19, 2012

(30) Foreign Application Priority Data

Oct. 18, 2010 (JP) ................... 2010233371

(51) Int. Cl.
*B62D 25/08* (2006.01)

(52) U.S. Cl.
USPC ......... 296/192; 264/339; 296/187.04; D12/91

(58) Field of Classification Search
USPC ......... 180/69.22; 264/35, 239, 249, 259, 266, 264/285, 319, 328.1, 339; 296/187.03, 296/187.04, 192, 193.11; D12/91, 173
See application file for complete search history.

(56) References Cited

U.S. PATENT DOCUMENTS

| | | | | |
|---|---|---|---|---|
| 1,783,896 A * | 12/1930 | Zimmers | .................... | 180/69.25 |
| 3,871,636 A * | 3/1975 | Boyle | .......................... | 267/140 |
| 4,247,510 A * | 1/1981 | Desverchere | .................. | 264/236 |
| 4,893,865 A * | 1/1990 | McClain et al. | .............. | 296/192 |
| 5,273,341 A * | 12/1993 | Cornille, Jr. | ............. | 296/193.11 |
| 5,618,018 A * | 4/1997 | Baniak | .......................... | 248/311.2 |
| 5,690,881 A * | 11/1997 | Horie et al. | .................... | 264/263 |
| 5,695,704 A * | 12/1997 | Sugiura et al. | ................ | 264/249 |
| 5,709,407 A * | 1/1998 | Stephens et al. | .............. | 280/751 |
| 5,758,565 A * | 6/1998 | Yamada | ......................... | 92/128 |
| 6,093,478 A * | 7/2000 | Jasinetzky et al. | ............. | 428/212 |
| 6,290,272 B1* | 9/2001 | Braun | .......................... | 293/120 |
| 6,471,902 B1* | 10/2002 | Snyder | ......................... | 264/294 |
| 6,681,543 B2* | 1/2004 | Nada et al. | .................... | 52/716.5 |
| 7,198,746 B1* | 4/2007 | Kobayashi | .................... | 264/249 |
| 7,204,545 B2* | 4/2007 | Roux et al. | ............... | 296/187.09 |
| 7,287,809 B2* | 10/2007 | Andre | ....................... | 296/187.09 |
| 7,316,448 B2* | 1/2008 | Koyama et al. | ............... | 296/192 |
| 7,357,446 B2* | 4/2008 | Sakai et al. | .................... | 296/192 |
| 7,575,273 B2* | 8/2009 | Wallman et al. | ......... | 296/193.11 |

(Continued)

FOREIGN PATENT DOCUMENTS

| | | | | |
|---|---|---|---|---|
| EP | 1564114 A2 | 8/2005 | | |
| FR | 2623455 A1 * | 5/1989 | ............. | B60R 13/07 |

(Continued)

OTHER PUBLICATIONS

European Patent Application No. 11181802.7 extended European Search Report dated Feb. 14, 2014 (7 pgs).

*Primary Examiner* — Glenn Dayoan
*Assistant Examiner* — Paul Chenevert
(74) *Attorney, Agent, or Firm* — Conley Rose, P.C.

(57) ABSTRACT

A cowl louver sealing structure that is capable of being positioned between a cowl louver and a hood of a vehicle may include an elastic sealing member capable of closing a space between an inner surface of the hood and the cowl louver. The sealing member is directly attached to the cowl louver.

7 Claims, 4 Drawing Sheets

(56) References Cited

U.S. PATENT DOCUMENTS

| | | | |
|---|---|---|---|
| 7,690,722 B2* | 4/2010 | Boggess | 296/207 |
| 7,740,307 B2* | 6/2010 | Benvenuto et al. | 296/192 |
| 7,849,559 B2* | 12/2010 | Lindmark et al. | 16/86 A |
| 7,988,223 B2* | 8/2011 | Nakajima et al. | 296/192 |
| 8,109,560 B2* | 2/2012 | Joly-Pottuz | 296/187.04 |
| 8,118,352 B2* | 2/2012 | Rocheblave et al. | 296/193.11 |
| 8,356,857 B2* | 1/2013 | Ralston et al. | 296/187.04 |
| 8,424,629 B2* | 4/2013 | Ralston et al. | 180/274 |
| 2009/0159384 A1* | 6/2009 | Chitteti et al. | 188/377 |
| 2012/0223546 A1* | 9/2012 | Serizawa et al. | 296/192 |
| 2013/0033071 A1* | 2/2013 | Kurata et al. | 296/192 |
| 2013/0221705 A1* | 8/2013 | Sugishima et al. | 296/192 |

FOREIGN PATENT DOCUMENTS

| | | | | |
|---|---|---|---|---|
| JP | 58218474 A | * | 12/1983 | B62D 25/08 |
| JP | 01218920 A | * | 9/1989 | B60J 1/02 |
| JP | 05016836 A | * | 1/1993 | B62D 25/08 |
| JP | 05039061 A | * | 2/1993 | B62D 25/10 |
| JP | 05064824 A | * | 3/1993 | B29C 45/00 |
| JP | 05097062 A | * | 4/1993 | B62D 25/08 |
| JP | 08-118945 A | | 5/1996 | |
| JP | 08118945 A | * | 5/1996 | B60H 1/28 |
| JP | 2007-137363 A | | 6/2007 | |
| JP | 2010006214 A | | 1/2010 | |
| JP | 2010-167943 A | | 8/2010 | |
| WO | 2010/073672 A1 | | 7/2010 | |

* cited by examiner

COWL LOUVER SEALING STRUCTURE

CROSS-REFERENCE TO RELATED APPLICATIONS

This application claims the benefit of Japanese Patent Application No. 2010-233371 filed Oct. 18, 2010, which is incorporated herein by reference in its entirety for all purposes.

STATEMENT REGARDING FEDERALLY SPONSORED RESEARCH OR DEVELOPMENT

Not applicable.

BACKGROUND

1. Field of the Invention

The present invention relates to a cowl louver sealing structure of a vehicle. More particularly, the present invention relates to a cowl louver sealing structure capable of preventing engine heat from entering a vehicle cabin.

2. Description of Related Art

A known cowl louver sealing structure of a vehicle is constructed of a base member made of a hard resin and a sealing member made of a soft resin that is capable of elastically deforming. The sealing member is attached to the base member via a double-sided tape or an adhesive, so as to be integrated therewith. The base member having the sealing member is connected to a cowl louver of the vehicle via clips or fastener belts, so that the cowl louver sealing structure is attached to the cowl louver. The cowl louver having the cowl louver sealing structure thus constructed is positioned between a windshield and a hood while the sealing member contacts an inner surface of the hood. Thus, the sealing member integrated with the base member can be positioned between the hood and the cowl louver. As a result, heat and sound generated in an engine compartment can be prevented from entering a vehicle cabin through an air-conditioner duct.

According to the cowl louver sealing structure, when an external force exceeding a certain value is applied to the hood, an impact caused by the force can be generated in the hood. The impact generated in the hood can be absorbed or dampened by elastic deformation of the sealing member attached to the cowl louver. Thus, the cowl louver (the cowl louver sealing structure) may absorb the impact generated in the hood. That is, the cowl louver may have impact dampening performance.

Further, the impact dampening performance of the cowl louver can be determined to meet a standard for pedestrian protection in case of a collision accident.

As described above, in the known cowl louver sealing structure, the base member and the sealing member are separately formed. The sealing member is attached to the base member via the double-sided tape or other such means. Thereafter, the base member having the sealing member is connected to the cowl louver, so that the sealing member is attached to the cowl louver via the base member. Thus, a work for manufacturing the cowl louver sealing structure is complicated and time consuming. That is, manufacturing efficiency of the cowl louver sealing structure can be reduced. This may lead to increased manufacturing costs of the cowl louver sealing structure.

Further, in the known cowl louver sealing structure, when the impact caused by the external force applied to the hood can be absorbed or dampened mainly by the sealing member. That is, the base member does not substantially function to absorb or dampen the impact. As a result, the cowl louver cannot have sufficient impact dampening performance that can meet the standard for pedestrian protection. Thus, there is a need in the art for an improved cowl louver sealing structure.

Another known cowl louver sealing structure of a vehicle is taught by, for example, Japanese Laid-Open Patent Publication Number 2010-6214. In the cowl louver sealing structure, a cowl louver is composed of a cowl louver main body, a back wall portion, a bottom wall portion, and a front wall portion that are integrally formed. A sealing member is attached to the front wall portion. Further, a reinforcement rib portion is integrally formed between the bottom wall portion and the back wall portion. The cowl louver thus constructed is positioned between a windshield and a hood while the sealing member contacts the hood. As a result, heat and sound generated in an engine compartment can be prevented from entering a vehicle cabin through an air-conditioner duct.

According to the cowl louver sealing structure, when an external force exceeding a certain value is applied to the hood, an impact caused by the force can be generated in the hood. The impact generated in the hood can be absorbed or dampened by the sealing member. At the same time, the front wall portion and the bottom wall portion of the cowl louver can be deformed while the reinforcement rib portion is broken. Thus, the cowl louver (the cowl louver sealing structure) may absorb the impact generated in the hood. That is, the cowl louver may have impact dampening performance.

BRIEF SUMMARY OF THE INVENTION

For example, in one aspect of the present invention, a cowl louver sealing structure that is capable of being positioned between a cowl louver and a hood of a vehicle may include an elastic sealing member capable of closing a space between an inner surface of the hood and the cowl louver. The sealing member is directly attached to the cowl louver.

According to the aspect of the invention, an attachment member of the sealing member is not required. Therefore, manufacturing costs of the cowl louver sealing structure (the sealing member) can be reduced.

Further, when an external force exceeding a certain value is applied to the hood, the sealing member can be sufficiently elastically deformed or flexed, so as to absorb or dampen an impact caused by the force. Thus, the cowl louver can have sufficient impact dampening performance that can meet a standard for pedestrian protection in case of a collision accident.

In another aspect of the present invention, the sealing member may have a plate-shape and may be connected to the cowl louver such that side surfaces thereof can be inclined at an angle to a line that is perpendicular to the inner surface of the hood. According to this aspect, when the external force is applied to the hood, the sealing member can be smoothly elastically deformed, so as to effectively absorb or dampen the impact caused by the force.

In a further aspect, the cowl louver sealing structure may further include a support portion that is formed in the cowl louver, in which the sealing member is attached to the cowl louver while a base portion thereof is held by the support portion. According to this aspect, the sealing member can be reliably attached to the cowl louver.

Further, the present invention provides a method of manufacturing a cowl louver sealing structure that is capable of being positioned between a cowl louver and a hood of a vehicle. The method includes directly molding a sealing member on the cowl louver using a molding die, so as to directly attach the same to the cowl louver. According to the method, the sealing member can be easily and quickly attached to the cowl louver.

Optionally, in the method, a pair of ribs may previously be formed in the cowl louver. Further, the directly molding step of the sealing member may be performed while pressing the pair of ribs by the molding die, so as to form a support portion to hold a base portion of the sealing member in the cowl louver. Preferably, the base portion of the sealing member can be molded within the support portion formed in the cowl louver. According to the method, the sealing member can be easily and quickly attached to the cowl louver while the base portion thereof is held by the support portion.

Other objects, features and advantages of the present invention will be readily understood after reading the following detailed description together with the accompanying drawings and the claims.

DETAILED DESCRIPTION OF THE INVENTION

A representative embodiment of a cowl louver sealing structure (device) of the present invention will now be described in detail with reference to FIGS. 1 to 6(B).

Figure 1:
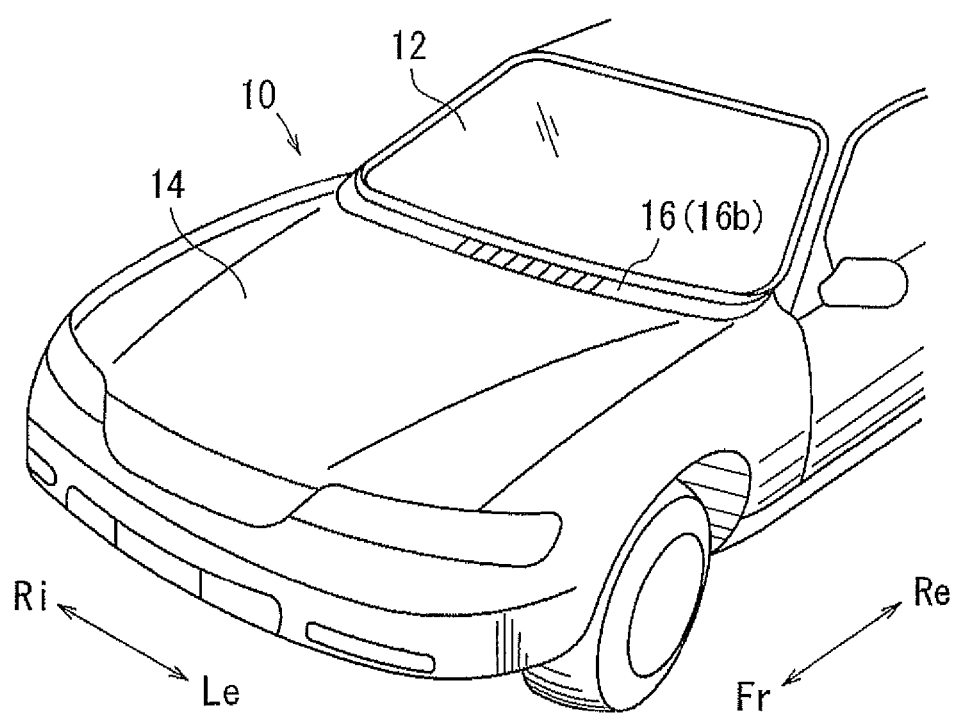
FIG. 1 is a front perspective view of a vehicle having a cowl louver according to a representative embodiment of the present invention.

As shown in FIG. 1, a cowl louver 16 is disposed between a windshield 12 of a vehicle 10 and a hood 14 of the vehicle 10. The cowl louver 16 is elongated in a transverse or right-left (Ri-Le) direction of the vehicle 10 and extends over a substantially entire width of the vehicle 10. Further, the cowl louver 16 has a certain width corresponding to a longitudinal or front-rear (Fr-Re) direction of the vehicle 10. The cowl louver 16 is connected to a lower periphery of the windshield 12 and a body panel (not shown) via connecting devices (not shown). The cowl louver 16 may preferably be integrally formed of a resinous material such as polypropylene (PP).

Figure 2:
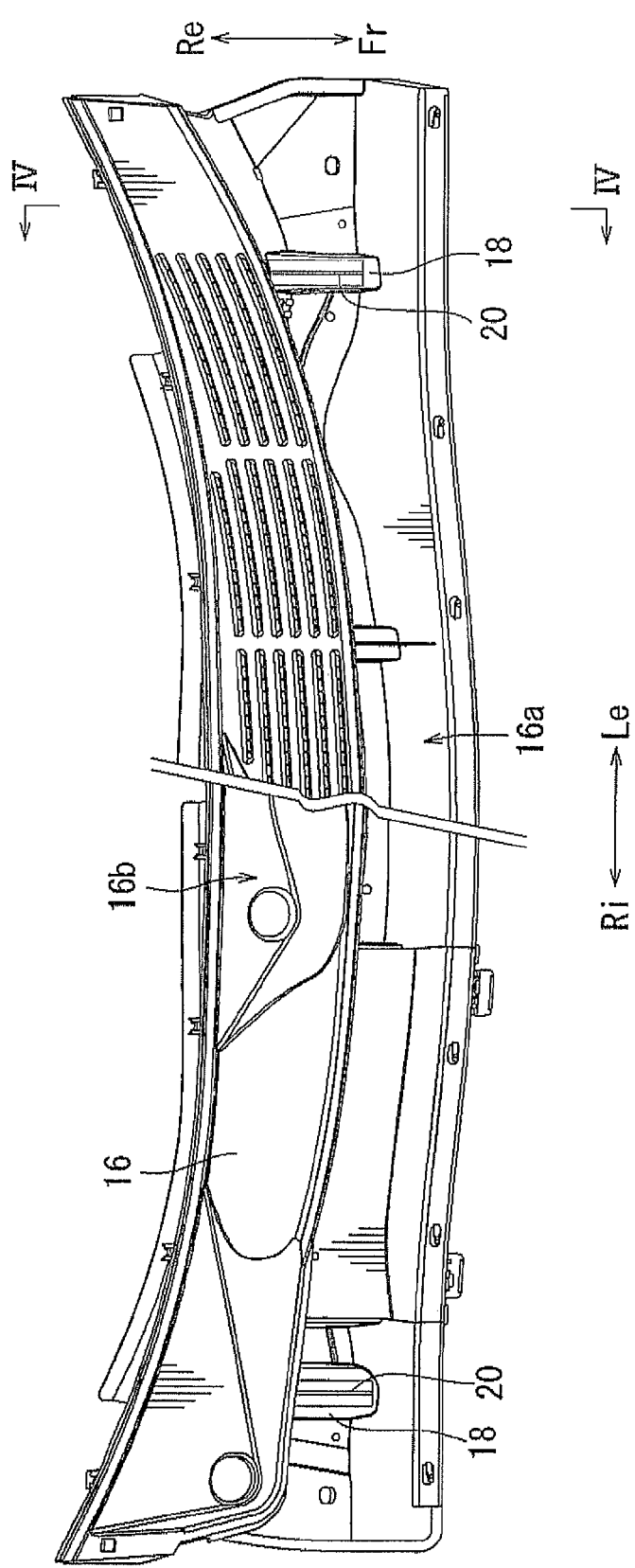
FIG. 2 is a partially plan view of the cowl louver.
Figure 3:
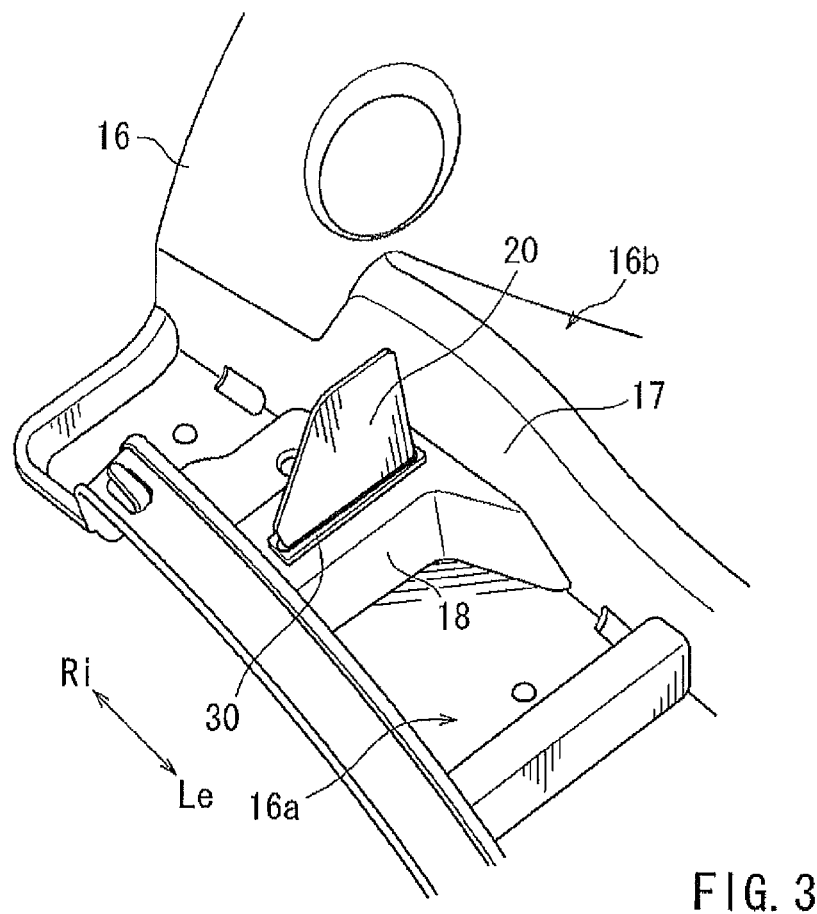
FIG. 3 is an enlarged perspective view of a side portion of the cowl louver.
Figure 4:
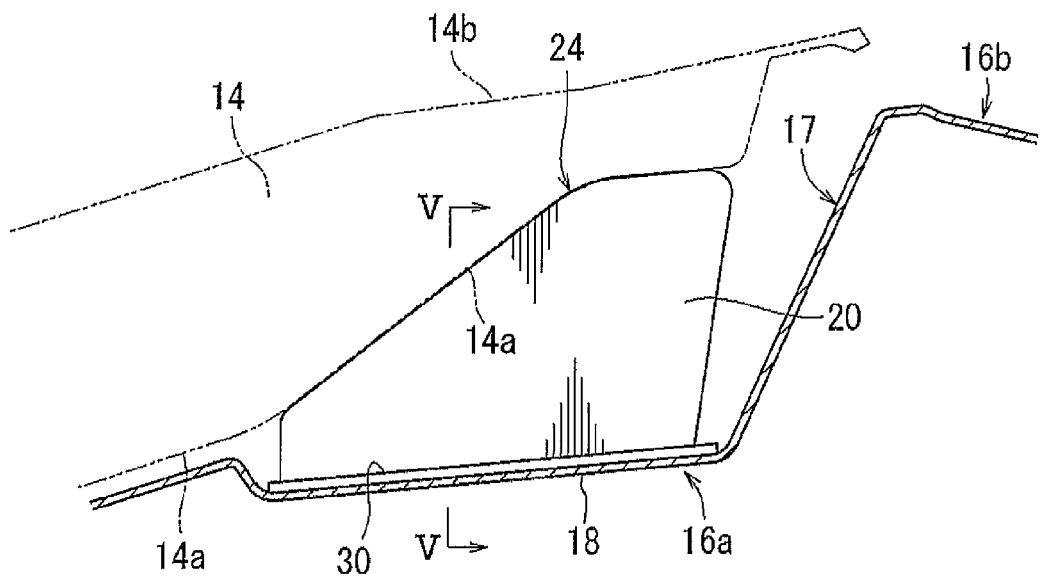
FIG. 4 is a cross-sectional view taken along line IV-IV of FIG. 2, which view illustrates a cowl louver sealing structure.

As shown in FIGS. 2 to 4, the cowl louver 16 is composed of a front portion 16a and a rear portion 16b. The front portion 16a is shaped to be positioned below the hood 14. Conversely, the rear portion 16b is shaped to be positioned in a space between the windshield 12 and the hood 14, so as to close the space. As shown in FIG. 2, the front portion 16a of the cowl louver 16 has a pair of upwardly bulged seat portions 18 that are respectively formed in lateral end (side) portions thereof. A pair of fin-shaped (plate-shaped) sealing members 20 are respectively attached to the seat portions 18. Each of the sealing members 20 is made of a soft material such as a thermoplastic elastomer (TPE) that can be elastically deformed or flexed when loaded. The sealing members 20 thus constructed may constitute the cowl louver sealing structure.

As shown in FIGS. 3 and 4, the sealing members 20 are respectively vertically attached to the seat portions 18 of the cowl louver 16. Further, as shown in FIG. 2, the sealing members 20 are respectively positioned such that inner side surfaces of the sealing members 20 can transversely oppositely face when the cowl louver 16 is attached to the vehicle 10. Further, as shown in FIG. 4, each of the sealing members 20 is shaped such that an upper peripheral end surface 24 thereof can contact an inner hood panel 14a of the hood 14. In other words, each of the sealing members 20 is shaped such that no clearance can be formed between the upper peripheral end surface 24 thereof and the inner hood panel 14a of the hood 14.

Thus, each of the sealing members 20 can be positioned between the hood 14 and the cowl louver 16 while the upper peripheral end surface 24 thereof contacts the inner hood panel 14a of the hood 14. Therefore, a space between the hood 14 and the cowl louver 16 can substantially be closed or sealed at both ends by the sealing members 20, so that heat and sound generated in an engine compartment can be prevented from entering a vehicle cabin through an air-conditioner duct (not shown). As a result, air conditioning and noise insulating performance can be increased in the vehicle cabin.

Generally, when an external force exceeding a certain value is applied to the hood 14, an impact caused by the force can be generated in the hood 14. However, as described above, because each of the sealing members 20 is made of the soft material that can be elastically deformed or flexed, the impact generated in the hood 14 can be absorbed or dampened by elastic deformation of the sealing members 20, which will be hereinafter described in detail.

Figure 5:
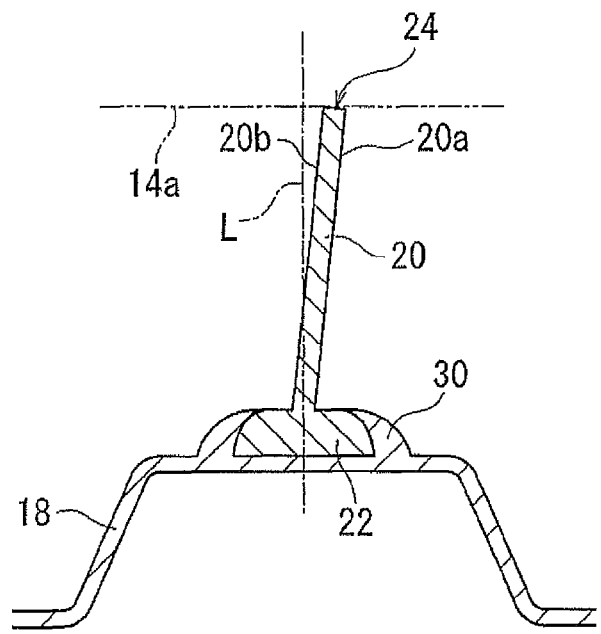
FIG. 5 is a cross-sectional view taken along line V-V of FIG. 4.

As shown in FIG. 5, the sealing members 20 (one of which is shown) respectively have enlarged or widened base portions 22 that are integrally formed in lower peripheral end surfaces thereof. The base portions 22 are respectively integrally connected to upper surfaces of the seat portions 18 of the cowl louver 16, so that the sealing members 20 can be integrated with the seat portions 18. Conversely, the seat portions 18 respectively have support portions 30 that are integrally formed in the upper surface thereof. The support portions 30 are respectively shaped to hold the base portions 22 of the sealing members 20, so that the sealing members 20 can be reliably integrated with the seat portions 18. The support portions 30 thus formed may also constitute the cowl louver sealing structure.

Further, as shown in FIG. 5, each of the sealing members 20 is transversely inclined. That is, opposite side surfaces 20a and 20b of each of the sealing members 20 are transversely inclined at an angle to a line L that is perpendicular to an inner surface of the hood 14 (an inner surface of the inner hood panel 14a). Therefore, when the external force exceeding a certain value is applied to the hood 14, the sealing members 20 can be smoothly deformed or flexed, so as to effectively absorb or dampen the impact caused by the force.

The sealing members 20 can respectively be attached to the seat portions 18 of the cowl louver 16 by direct molding. That is, the sealing members 20 can respectively be directly molded or formed on the seat portions 18 of the cowl louver 16, so as to be directly attached thereto. A method of attaching the sealing members 20 to the seat portions 18 will now be described in detail with reference to FIGS. 6(A) and 6(B). Further, because the sealing members 20 (the seat portions 18 and the support portions 30) respectively have the same constructions as each other, only one of the sealing members 20 (the seat portions 18 and the support portions 30) is hereinafter described.

Figures 6A, 6B:
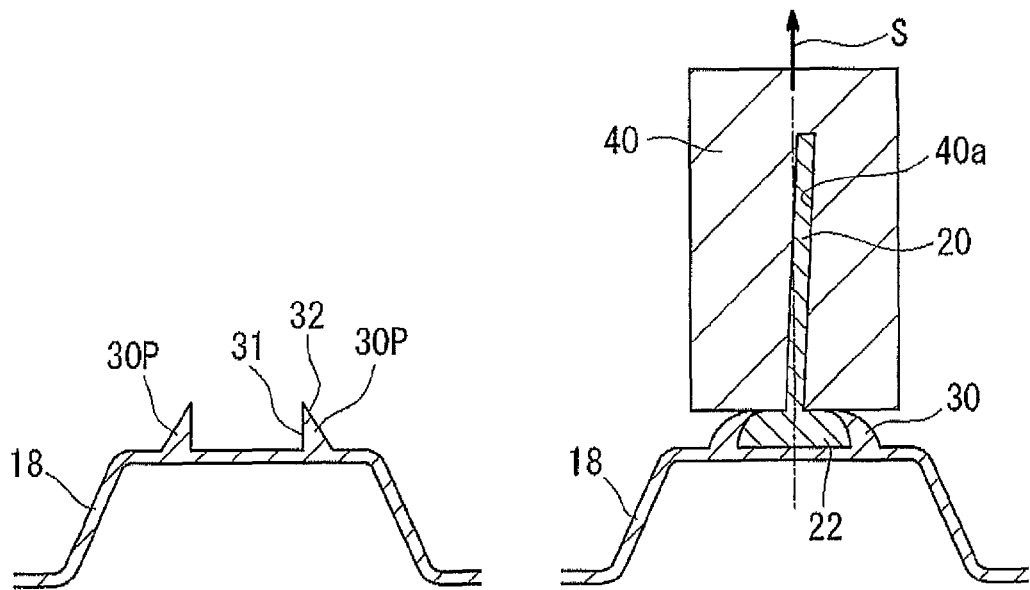
FIG. 6(A) is an explanatory view, illustrating a process for forming a sealing member in the cowl louver.
FIG. 6(B) is an explanatory view, illustrating the process for forming the sealing member in the cowl louver.

First, as shown in FIG. 6(A), a pair of elongated ribs 30P are oppositely formed in the upper surface of the corresponding seat portion 18 of the cowl louver 16. As will be recognized, the ribs 30P are configured to be converted to the support portion 30 when the sealing member 20 is attached (molded) to the seat portion 18. The ribs 30P are integrally formed in the upper surface of the seat portion 18 when the cowl louver 16 is formed by integral molding of polypropylene (PP). Further, each of the ribs 30P may preferably be shaped to have a length that is greater than a length (a length in the front-rear direction) of the base portion 22 of the sealing member 20.

Thereafter, as shown in FIG. 6(B), a molding die 40 having a seal member molding space 40a is positioned on the seat portion 18 while pressing the pair of ribs 30P from above. Subsequently, a molten soft material (e.g., a molten TPE) is introduced into the molding die 40 by, for example, injection. As a result, the molten soft material can be introduced into the seal member molding space 40a while it is introduced into a space between the ribs 30P. At this time, the ribs 30P are flexibly deformed inwardly by a pressing force of the molding die 40, so that the support portion 30 can be formed on the seat portion 18.

Further, when the molten soft material is injected into the molding die 40 while the ribs 30P are pressed by the molding die 40, heat from the molten material can be transmitted to the ribs 30P to soften the same. Therefore, the ribs 30P can be easily deformed inwardly by the molding die 40, so that the support portion 30 can be easily formed. In addition, because the ribs 30P are pressed by the molding die 40 when the molten material is injected into the molding die 40, the molten material can be effectively prevented from being leaked from between the ribs 30P and the molding die 40.

After the injected molten material is cooled to be set or cured, the molding die 40 is removed in a direction S along the line L. As a result, the sealing member 20 having the base portion 22 can be formed on the seat portion 18 of the cowl louver 16. As will be recognized, the base portion 22 can be formed by the molten material that is introduced into the support portion 30 (the space between the ribs 30P). The base portion 22 thus formed can be integrally connected to the upper surface of the seat portion 18 and an inner surface of the support portion 30. Thus, the sealing member 20 can be integrated with the seat portions 18 while the base portion 22 is held by the support portion 30.

As described above, the sealing member 20 is transversely inclined to the line L (FIG. 5). However, because the sealing member 20 is made of the soft material (e.g., TPE), the molding die 40 can be smoothly removed in the direction S along the line L. In other words, because the whole sealing member 20 is made of the soft material (e.g., TPE), the sealing member 20 can be easily formed in the seat portions 18 of the cowl louver 16 while it is transversely inclined to the line L.

As shown in FIG. 6(A), each of the ribs 30P has a triangular shape in cross section and has an inner surface 31 and an outer surface 32. Further, the inner surface 31 is substantially vertically extended from the upper surface of the seat portion 18 whereas the outer surface 32 is obliquely extended from the upper surface of the seat portion 18. That is, the outer surface 32 has an inclination angle greater than the inclination angle of the inner surface 32. Therefore, the ribs 30P can be reliably deformed inwardly when the ribs 30P are pressed by the molding die 40.

As described above, in this embodiment, the sealing member 20 is directly molded on the seat portion 18 of the cowl louver 16 while the molding die 40 is pressed against the seat portion 18 (the ribs 30P). Therefore, the sealing member 20 can be easily and quickly attached to the seat portion 18. Further, a work for attaching the sealing member 20 can be simplified. As a result, manufacturing costs of the sealing member 20 (the cowl louver sealing structure) can be reduced.

Further, according to the cowl louver sealing structure, when the external force exceeding a certain value is applied to the hood 14 in a direction that is directed from an outer panel 14b of the hood 14 toward the inner panel 14a of the hood 14 (i.e., when the inner panel 14a of the hood 14 is displaced inwardly), the sealing member 20 can be smoothly deformed or flexed, so as to effectively absorb or dampen the impact caused by the force. Thus, the cowl louver 16 can have sufficient impact dampening performance that can meet a standard for pedestrian protection in case of a collision accident.

The reason the sealing member 20 can be smoothly deformed is because the sealing member 20 (the side surfaces 20a and 20b) is transversely inclined at an angle to the line L. As described above, the upper peripheral end surface 24 of the sealing member 20 contacts the inner hood panel 14a of the hood 14. Therefore, if the sealing member 20 is not inclined relative to the line L and is positioned perpendicular to the inner surface of the inner hood panel 14a; of the hood 14, the sealing member 20 cannot be smoothly deformed when the external force is applied to the hood 14.

Further, as described above, each of the ribs 30P has the special triangular shape in cross section. Therefore, the ribs 30P can be reliably and accurately deformed inwardly when the ribs 30P are pressed by the molding die 40. As a result, the formed support portion 30 may have a uniform shape having a good appearance.

Various changes and modifications may be made to the representative embodiment without departing from the scope of the present invention. For example, in this embodiment, the sealing members 20 are respectively connected to only the seat portions 18 of the cowl louver 16. However, the sealing members 20 can respectively be connected to the seat portions 18 and a vertical wall portion 17 (FIGS. 3 and 4) that is continuous with the seat portions 18, so as to further reliably close the space between the inner panel 14a of the hood 14 and the cowl louver 16.

Further, the support portions 30 (the ribs 30P) that are formed in the seat portions 18 can be omitted, if necessary.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A cowl louver structure that is configured to be disposed between a cowl louver and a hood of a vehicle, the vehicle having a longitudinal axis, the cowl louver having a pair of lateral end portions, the cowl louver structure comprising:
   a pair of plate-shaped members configured to engage each of an inner surface of the hood and the cowl louver;
   wherein each of the members includes an upper peripheral surface;

wherein the members are directly attached to the cowl louver;

wherein the members are each positioned proximate one of the lateral end portions of the cowl louver; and wherein the members are each positioned such that each extends substantially along the longitudinal axis of the vehicle and the upper peripheral surface is configured to contact the inner surface of the hood.

2. The cowl louver structure of claim 1, wherein each of the members includes a pair of side surfaces;

wherein each of the members is positioned such that each of the pair of side surfaces extends substantially along the longitudinal axis of the vehicle; and wherein each of the members is connected to the cowl louver such that each of the side surfaces of the member are inclined at a non-zero angle to a line that is normal to the inner surface of the hood.

3. The cowl louver structure of claim 1 further comprising a pair of support portions that are formed in the cowl louver, wherein a base portion of each of the members is held by one of the support portions.

4. A method of manufacturing a cowl louver structure that is configured to be disposed between a cowl louver and a hood of a vehicle, the vehicle having a longitudinal axis, the cowl louver having a pair of lateral end portions, the method comprising:

directly molding a pair of plated-shaped members on the cowl louver using a molding die, the members configured to engage each of an inner surface of the hood and the cowl louver;

wherein the members are each positioned proximate one of the lateral end portions of the cowl louver and each extends substantially along the longitudinal axis of the vehicle; and wherein each of the members includes an upper peripheral surface that is configured to contact the inner surface of the hood.

5. The method of claim 4, further comprising:

forming a pair of ribs on each of the lateral end portions of the cowl louver prior to directly molding the pair of members on the cowl louver, and pressing each of the pairs of ribs with the molding die to form a first support portion to hold a base portion of one of the members and a second support portion to hold a base portion of another of the members on the cowl louver.

6. The method of claim 5, wherein the base portion of each of the members is molded within one of the first support portion and the second support portion.

7. A vehicle having a longitudinal axis, the vehicle comprising:

a hood including an inner surface;

a cowl louver;

a cowl louver structure disposed between the cowl louver and the inner surface of the hood and including:

a member including a pair of side surfaces, an upper peripheral surface, and a base;

wherein the upper peripheral surface contacts the inner surface of the hood;

wherein each of the pair of side surfaces extend substantially along the longitudinal axis of the vehicle and each is inclined at a non-zero angle to a line that is normal to the inner surface of the hood; and wherein the base is disposed between a pair of ribs formed on the cowl louver.

* * * * *